(12) United States Patent
Qi et al.

(10) Patent No.: US 12,701,159 B2
(45) Date of Patent: Aug. 4, 2026

(54) APPARATUS, SYSTEM, AND METHOD OF PEER-TO-PEER (P2P) COMMUNICATION

(71) Applicant: Intel Corporation, Santa Clara, CA (US)

(72) Inventors: Emily H. Qi, Gig Harbor, WA (US); Ilan Peer, Modiin (IL); Ido Ouzieli, Tel Aviv (IL); Carlos Cordeiro, Portland, OR (US); Preston Hunt, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 50 days.

(21) Appl. No.: 18/091,023

(22) Filed: Dec. 29, 2022

(65) Prior Publication Data

US 2023/0308506 A1 Sep. 28, 2023

Related U.S. Application Data

(60) Provisional application No. 63/323,939, filed on Mar. 25, 2022.

(51) Int. Cl.
| | |
|---|---|
| *H04L 67/104* | (2022.01) |
| *H04L 51/04* | (2022.01) |
| *H04W 12/041* | (2021.01) |

(52) U.S. Cl.
CPC ............ *H04L 67/104* (2013.01); *H04L 51/04* (2013.01); *H04W 12/041* (2021.01)

(58) Field of Classification Search
CPC ..... H04L 67/104; H04W 12/041; H01L 51/04
See application file for complete search history.

(56) References Cited

U.S. PATENT DOCUMENTS

| | | | |
|---|---|---|---|
| 2006/0135170 A1* | 6/2006 | Patenaude ............. | H04W 76/19 455/450 |
| 2012/0272055 A1* | 10/2012 | Jung ..................... | H04W 12/08 713/153 |

(Continued)

OTHER PUBLICATIONS

IEEE Standard for Information Technology—Telecommunications and Information Exchange between Systems Local and Metropolitan Area Networks-Specific Requirements, Part 11: Wireless LAN Medium Access Control (MAC) and Physical Layer (PHY) Specifications, IEEE Computer Society, IEEE Std 802.11™—2020 (Revision of IEEE Std 802.11-2016), Approved Dec. 3, 2020, 4379 pages.

(Continued)

*Primary Examiner* — David R Lazaro
*Assistant Examiner* — Xiang Yu
(74) *Attorney, Agent, or Firm* — Shichrur & Co.

(57) ABSTRACT

For example, a first wireless communication device may be configured to determine a negotiated bootstrapping mechanism based on a first message-exchange including Peer-to-Peer (P2P) messages exchanged with a second wireless communication device; to pair the first wireless communication device with the second wireless communication device according to the negotiated bootstrapping mechanism; to derive a Pairwise Master Key Security Association (PMKSA) based on a second message-exchange with the second wireless communication device, e.g., after pairing with the second wireless communication device; and to determine an encryption key according to a third message exchange with the second wireless communication device based on the PMKSA. For example, the encryption key may be configured to encrypt a P2P communication with the second wireless communication device.

24 Claims, 7 Drawing Sheets

(56)  References Cited

U.S. PATENT DOCUMENTS

| 2019/0356482 | A1* | 11/2019 | Nix | H04W 12/041 |
| 2020/0021400 | A1* | 1/2020 | Cherian | H04L 1/1614 |
| 2022/0294625 | A1* | 9/2022 | Choi | H04L 9/0861 |
| 2023/0269581 | A1* | 8/2023 | Ho | H04W 12/03 |
| | | | | 713/171 |

OTHER PUBLICATIONS

Wi-Fi Direct Specification, Version 1.9, Oct. 2021, 200 pages.
Wi-Fi Aware™ Specification, Version 3.2, Oct. 2020, 214 pages.
Wi-Fi Certified WPA3™, Technology Overview, Jan. 2021, Wi-Fi Alliance, 9 pages.

* cited by examiner

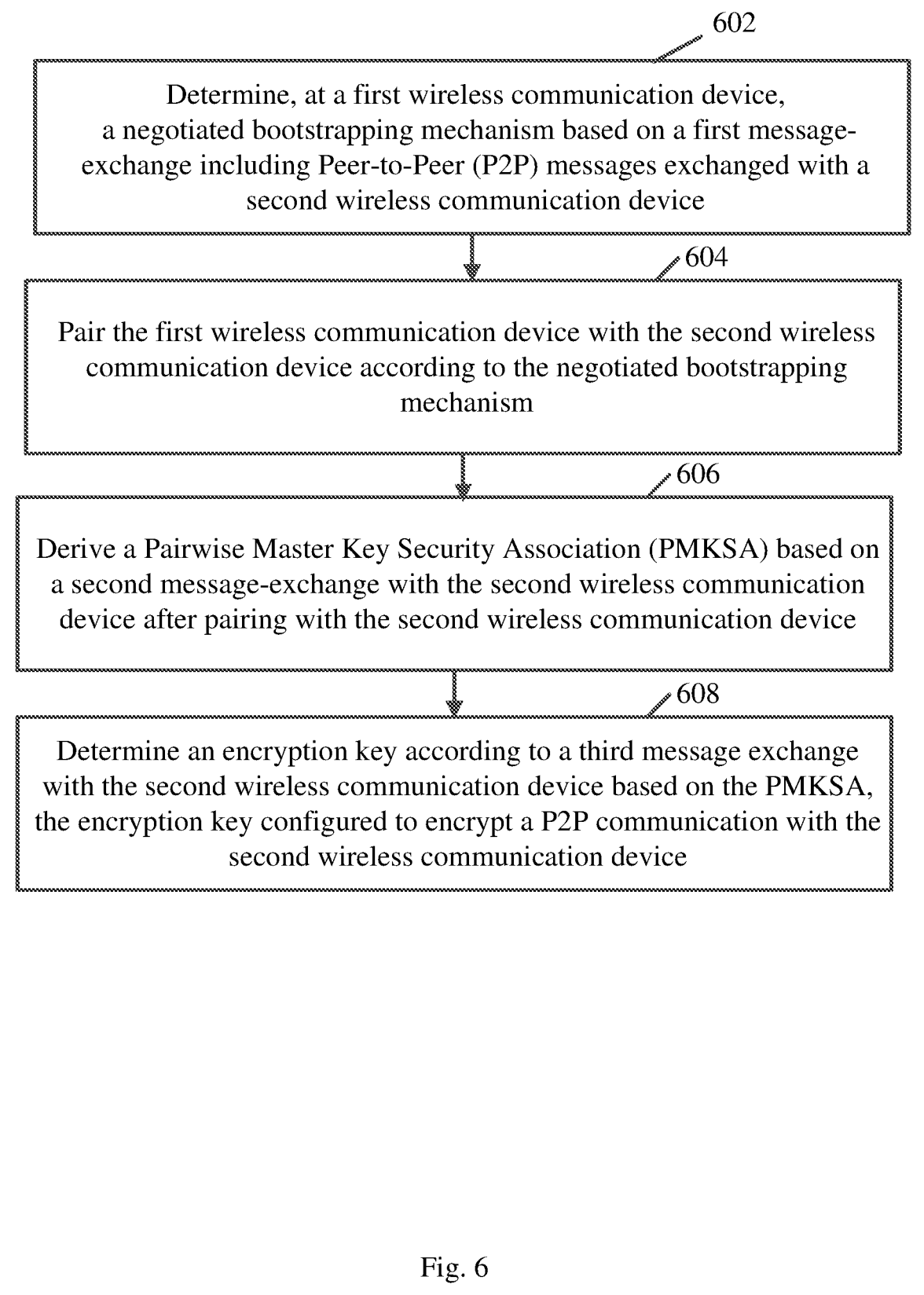

602

Determine, at a first wireless communication device, a negotiated bootstrapping mechanism based on a first message-exchange including Peer-to-Peer (P2P) messages exchanged with a second wireless communication device

604

Pair the first wireless communication device with the second wireless communication device according to the negotiated bootstrapping mechanism

606

Derive a Pairwise Master Key Security Association (PMKSA) based on a second message-exchange with the second wireless communication device after pairing with the second wireless communication device

608

Determine an encryption key according to a third message exchange with the second wireless communication device based on the PMKSA, the encryption key configured to encrypt a P2P communication with the second wireless communication device

Fig. 6

APPARATUS, SYSTEM, AND METHOD OF PEER-TO-PEER (P2P) COMMUNICATION

CROSS REFERENCE

This application claims the benefit of and priority from U.S. Provisional Patent Application No. 63/323,939 entitled "DEVICE PAIRING AND PROVISIONING FOR PEER-TO-PEER COMMUNICATION", filed Mar. 25, 2022, the entire disclosure of which is incorporated herein by reference.

TECHNICAL FIELD

Aspects described herein generally relate to Peer-to-Peer (P2P) communication.

BACKGROUND

A pairing and provisioning method may include a pairing stage, which may be utilized to pair two wireless communication devices, for example, by linking the two wireless communication devices, e.g., once a permission to link the two wireless communication devices is granted.

The pairing and provisioning method may include a provisioning stage, which may be utilized, for example, by forming a wireless communication network between the two wireless communication devices to communicate data between the two wireless communication devices, for example, after pairing the two wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 6 is a schematic flow-chart illustration of a method of P2P communication, in accordance with some demonstrative aspects.

DETAILED DESCRIPTION

Figure 1:
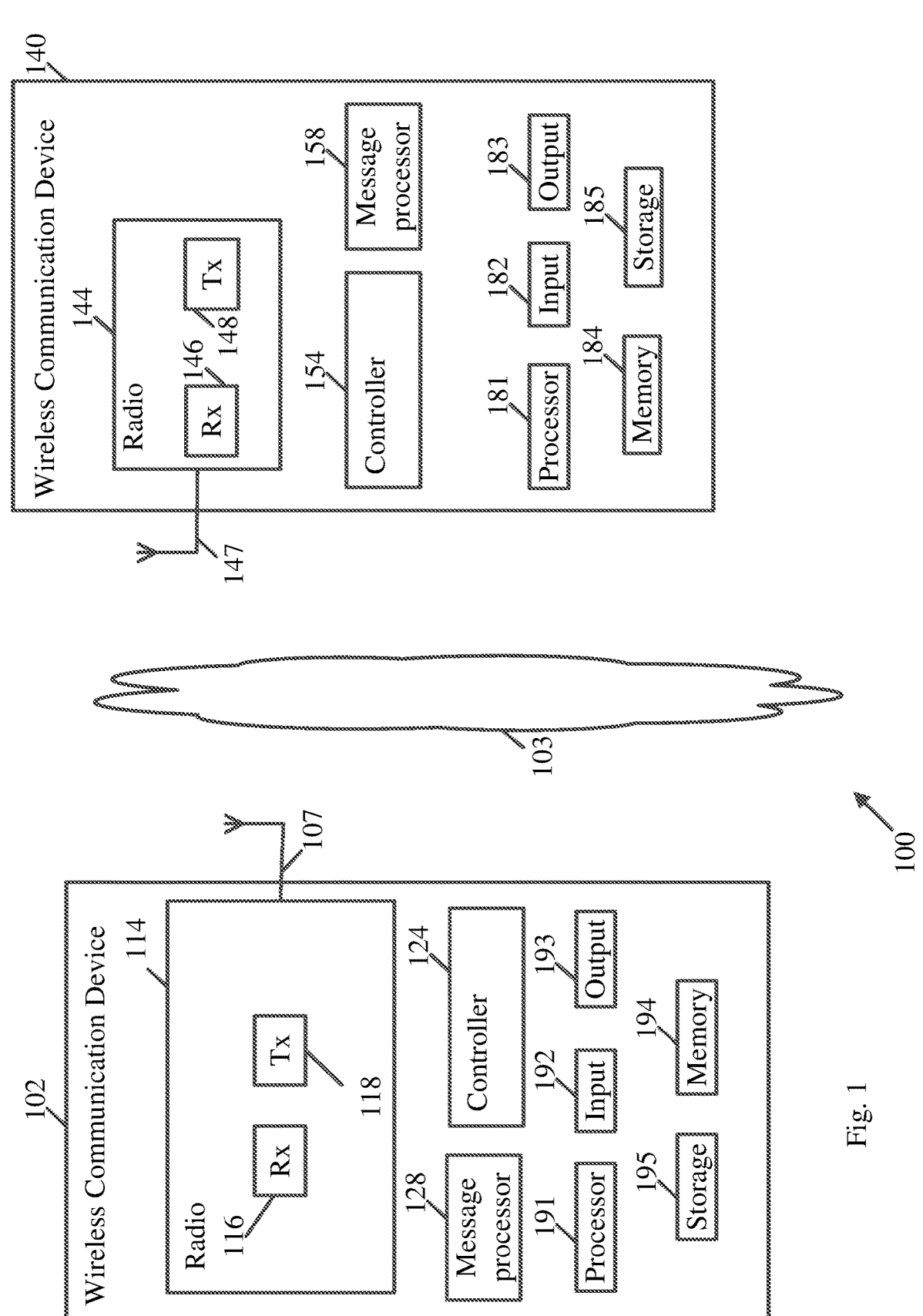
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (*IEEE 802.11-2020, IEEE Standard for Information Technology—Telecommunications and Information Exchange between*

*Systems Local and Metropolitan Area Networks—Specific Requirements; Part 11: Wireless LAN Medium Access Control (MAC) and Physical Layer (PHY) Specifications, December, 2020)), and/or future versions and/or derivatives* thereof, devices and/or networks operating in accordance with existing WiFi Alliance (WFA) specifications (including the Wi-FI Direct Specification (*Wi-Fi Direct Specification, Version* 1.9, *October* 2021)) and/or future versions and/or derivatives thereof, devices and/or networks operating in accordance with existing cellular specifications and/or protocols, and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency band below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band. Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative aspects may be implemented for "Peer to Peer (P2P) Communication", which may relate to device-to-device communication over a wireless link ("peer-to-peer link") between devices. The P2P communication may include, for example, a Wi-Fi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), a Wi-Fi Aware communication, or the like. Other aspects may be implemented for any other additional or alternative communication scheme.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, and/or one more other devices.

In some demonstrative aspects, device 102 and/or device 140 may include a mobile device or a non-mobile, e.g., a static, device.

For example, device 102 and/or device 140 may include, for example, a UE, an MD, a STA, an AP, a Smartphone, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a video source, an audio source, a video sink, an audio sink, a stereo tuner, a broadcast radio receiver, a digital audio player, a speaker, an audio receiver, an audio amplifier, a gaming device, a data source, a data sink, a media player, a television, a music player, a smart device such as, for example, lamps, climate control, car components, household components, appliances, and the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an OS of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a disk drive, a solid-state drive (SSD), and/or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102 and/or 140 may be capable of communicating content, data, information and/or signals via a wireless medium (WM) 103. In some demonstrative aspects, wireless medium 103 may include, for example, a radio channel, a cellular channel, an RF channel, a Wi-Fi channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, one or more channels in a 2.4 GHz wireless communication frequency band, one or more channels in a 5 GHz wireless communication frequency band, and/or one or more channels in a 6 GHz wireless communication frequency band. For example, WM 103 may additionally or alternatively include one or more channels in a mmWave wireless communication frequency band. In other aspects, WM 103 may include any other type of channel over any other frequency band.

In some demonstrative aspects, device 102 and/or device 140 may include one or more radios including circuitry and/or logic to perform wireless communication between devices 102, 140, and/or one or more other wireless communication devices. For example, device 102 may include at least one radio 114, and/or device 140 may include at least one radio 144.

In some demonstrative aspects, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative aspects, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative aspects, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, a mmWave band, and/or any other band, for example, a 5G band, an S1G band, and/or any other band.

In some demonstrative aspects, radios 114 and/or 144 may include, or may be associated with one or more antennas.

In some demonstrative aspects, device 102 may include one or more, e.g., a single antenna or a plurality of, antennas 107, and/or device 140 may include on or more, e.g., a single antenna or a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a single antenna, a plurality of antennas, a phased array antenna, a multiple element antenna, a set of switched beam antennas, and/or the like. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, antennas 107 and/or antennas 147 may be connected to, and/or associated with, one or more Radio Frequency (RF) chains.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other aspects, controller 124, message processor 128 and/or radio 114 may be implemented by one or more additional or alternative elements of device 102.

In some demonstrative aspects, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other aspects, controller 154, message processor 158 and/or radio 144 may be implemented by one or more additional or alternative elements of device 140.

In some demonstrative aspects, device 102, and/or device 140 may include, operate as, perform the role of, and/or perform one or more functionalities of, one or more STAs. For example, device 102 may include at least one STA, and/or device 140 may include at least one STA.

In other aspects, devices 102, and/or 140 may include, operate as, perform the role of, and/or perform one or more functionalities of, any other wireless device and/or station, e.g., a WLAN STA, a Wi-Fi STA, and the like.

In some demonstrative aspects, device 102, and/or device 140 may be configured operate as, perform the role of, and/or perform one or more functionalities of, an access point (AP), or any other AP.

In some demonstrative aspects, device 102, and/or device 140 may be configured to operate as, perform the role of, and/or perform one or more functionalities of, a non-AP STA.

In other aspects, device 102, and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative aspects, wireless communication device 102 and/or 140 may form, and/or may communicate as part of, a wireless local area network (WLAN).

In some demonstrative aspects, wireless communication devices 102 and/or 140 may form, and/or may communicate as part of, a WiFi network.

In some demonstrative aspects, wireless communication devices 102 and/or 140 may form, and/or may communicate as part of, a WiFi Direct (WFD) network, e.g., a WiFi Direct Services (WFDS) network.

In some demonstrative aspects, wireless communication devices 102 and/or 140 may form, and/or may communicate as part of, a P2P network.

In one example, wireless communication devices 102 and/or 140 may include, may operate as, and/or may perform the functionality of a WiFi Direct device.

In some demonstrative aspects, wireless communication devices 102 and/or 140 may operate as and/or perform the functionality of WFD P2P devices. For example, devices 102 and/or 140 may be able to operate as and/or perform the functionality of a P2P client device, and/or a P2P group Owner (GO) device.

In some demonstrative aspects, wireless communication medium 103 may include a direct link, for example, a P2P link, e.g., a WiFi direct P2P link or any other P2P link, for example, to enable direct communication between wireless communication devices 102, 140, and/or one or more other devices.

In some demonstrative aspects, devices 102 and/or 140 may be configured to communicate, for example, using a P2P network, a WFD network, and/or any other network.

In other aspects, wireless communication devices 102 and/or 140 may form, and/or communicate as part of, any other network, and/or may perform the functionality of any other wireless devices or stations.

In some demonstrative aspects, devices 102, and/or 140 may be configured to operate in accordance with one or more Specifications, for example, including WFA Direct Specifications, and/or one or more *IEEE* 802.11 *Specifications*, e.g., an *IEEE* 802.11-2020 *Specification*, and/or any other specification and/or protocol.

In some demonstrative aspects, device 102 and/or device 140 may be configured to implement one or more operations and/or functionalities of a provisioning and pairing mechanism, which may be configured, for example, for pairing and/or provisioning of WFD P2P devices, e.g., as described below.

In some demonstrative aspects, for example, in some use cases, scenarios, and/or implementations, there may be one or more disadvantages, inefficiencies, and/or technical problems in implementing one or more types of provisioning methods for provisioning of WFD P2P devices, e.g., as described below.

For example, a Wi-Fi Simple Configuration (WSC) (also named Wi-Fi Protected Setup (WPS)) technology may be used as a provisioning method for Wi-Fi direct P2P devices. However, the WCS technology was developed many years ago, and since then, there have been no major updates even though it has experienced significant market adoption.

For example, the WCS technology may not be capable of providing a solution with a security level, which may be required by some implementations, for example, for implementations of wireless communication devices to communicate over the 6 GHz spectrum.

In one example, the WCS technology may not be capable of supporting a provisioning solution, which is secure and/or efficient. For example, the WCS technology may have numerous security vulnerabilities, e.g., vulnerability to a brute-force attack, physical security issues, and/or the like.

In some demonstrative aspects, for example, in some use cases, scenarios, and/or implementations, there may be one or more disadvantages, inefficiencies, and/or technical problems to implement one or more operations and/or functionalities of WiFi provisioning methods, for example, for WFD P2P devices, e.g., as described below.

For example, a Device Provisioning Protocol (DPP) (also known as Wi-Fi Easy Connect) technology may be utilized to provision Wi-Fi devices connecting to WLAN. However, there is no definition on how to use DPP for Wi-Fi Direct or Peer to Peer communication.

For example, the DPP technology may require a heavy implementation and/or may be very complex for deployment.

In some demonstrative aspects, device 102 and/or device 140 may be configured to implement one or more operations and/or functionalities of a provisioning and pairing protocol, which may be configured, for example, for provisioning and pairing of WFD P2P devices, e.g., as described below.

In some demonstrative aspects, the provisioning and pairing protocol may be configured to provide a technical solution to support a secure and/or efficient pairing and provisioning for WFD P2P devices, e.g., as described below.

In some demonstrative aspects, the provisioning and pairing protocol may be configured to provide a technical solution to support fast and/or reliable P2P pairing and provisioning, e.g., as described below.

In some demonstrative aspects, the provisioning and pairing protocol may be configured to provide a technical solution to enable WFD P2P devices to derive a Primary Master Key (PMK), which may be used to secure a connection between the WFD P2P devices, e.g., as described below.

In some demonstrative aspects, the provisioning and pairing protocol may be configured to utilize the PMK, for example, with one or more established Wi-Fi mechanisms, to secure a connection between WFD P2P devices, for example, according to a 4-way handshake and/or any other additional or alternative mechanism to secure a connection based on the PMK, e.g., as described below.

In some demonstrative aspects, the provisioning and pairing protocol may be configured to provide a technical solution for provisioning of WFD P2P devices, for example, based on a common password possessed by the WFD P2P devices, e.g., as described below.

In some demonstrative aspects, the provisioning and pairing protocol may be configured to use a Simultaneous Authentication of Equals (SAE) and Hash to Element (H2E) (SAE-H2E) mechanism for provisioning, e.g., including derivation of the PMK, for example, when the WFD P2P devices possess the common password, e.g., as described below.

In some demonstrative aspects, the provisioning and pairing protocol may be configured to provide a technical solution for provisioning of WFD P2P devices, for example, in case the WFD P2P devices do not possess a common password, e.g., as described below. In one example, the WFD P2P devices may not possess a common password, for example, in case pairing is based on a push-button pairing mechanism and/or any other pairing mechanism which does not provide a common password to the WFD P2P devices.

In some demonstrative aspects, the provisioning and pairing protocol may be configured to use an Opportunistic Wireless Encryption (OWE) mechanism for provisioning, for example, in case the WFD P2P devices do not possess a common password, e.g., as described below.

In some demonstrative aspects, the provisioning and pairing protocol may be configured to provide a technical solution for provisioning and pairing, which may be fast, efficient, and/or reliable, e.g., as described below.

In some demonstrative aspects, the provisioning and pairing protocol may be configured to provide a technical solution for provisioning and pairing, which may be implemented to replace the WCS technology.

In some demonstrative aspects, the provisioning and pairing protocol may be configured to provide a technical solution for provisioning and pairing, which may support improved, e.g., current best-in-class, security and/or user experience (UX) methods.

In one example, the provisioning and pairing protocol may be implemented to provide a technical solution using a reduced number of messages, e.g., compared to the WCS technology. For example, the provisioning and pairing protocol may be implemented to provide a technical solution using only four SAE authentication messages, e.g., compared to more than ten messages and two connection establishments, which may be required by the WCS technology.

In some demonstrative aspects, the provisioning and pairing protocol may be configured to provide a technical solution to support a robust password-based authentication for provisioning and pairing, for example, based on a WiFi protected Access three (WPA3) SAE H2E technology, e.g., as described below.

In some demonstrative aspects, the provisioning and pairing protocol may be configured to provide a technical solution to support one or more use cases, which may require privacy, while not requiring authentication, e.g., as described below.

For example, the provisioning and pairing protocol may be configured to provide a technical solution to support provisioning based on the OWE technology, which may provide ease of use by supporting a "pushbutton" pairing mechanism, e.g., as described below.

In some demonstrative aspects, controller 124 may be configured to control, trigger, cause, and/or instruct device 102 to determine a negotiated bootstrapping mechanism, for example, based on a first message-exchange including P2P messages exchanged with a second wireless communication device, for example, wireless communication device 140, e.g., as described below.

In some demonstrative aspects, controller 124 may be configured to control, trigger, cause, and/or instruct device 102 to pair device 102 with device 140, for example, according to the negotiated bootstrapping mechanism, e.g., as described below.

In some demonstrative aspects, controller 124 may be configured to control, trigger, cause, and/or instruct device 102 to derive a Pairwise Master Key Security Association (PMKSA), for example, based on a second message-exchange with device 140, e.g., as described below.

In some demonstrative aspects, controller 124 may be configured to control, trigger, cause, and/or instruct device 102 to perform the second message-exchange with device 140, for example, after pairing with device 140, e.g., as described below.

In some demonstrative aspects, controller 124 may be configured to control, trigger, cause, and/or instruct device 102 to determine an encryption key, for example, according to a third message exchange with device 140, for example, based on the PMKSA, e.g., as described below.

In some demonstrative aspects, the encryption key may be configured to encrypt a P2P communication with device 140, e.g., as described below.

In some demonstrative aspects, the first message-exchange may include a first public action frame from device 102, e.g., to device 140, and a second public action frame from device 140, for example, to device 102, e.g., as described below.

In some demonstrative aspects, the first message-exchange may include a first P2P frame from device 102, e.g., to device 140, and a second P2P frame from device 140, for example, to device 102, e.g., as described below.

In some demonstrative aspects, the first P2P frame may include first supported bootstrapping functionality information to indicate one or more first bootstrapping functionalities supported by device 102, e.g., as described below.

In some demonstrative aspects, the second P2P frame may include second supported bootstrapping functionality information to indicate one or more second bootstrapping functionalities supported by device 140, e.g., as described below.

In some demonstrative aspects, controller 124 may be configured to control, trigger, cause, and/or instruct device 102 to determine the negotiated bootstrapping mechanism, for example, based on a match between a first identified bootstrapping functionality of the one or more first bootstrapping functionalities and a second identified bootstrapping functionality of the one or more second bootstrapping functionalities, e.g., as described below.

In some demonstrative aspects, one of the first and second P2P frames may include a P2P probe request, and another one of the first and second P2P frames may include a P2P probe response, e.g., as described below.

In some demonstrative aspects, the first P2P frame may include a first bootstrapping functionality indication to indicate a first bootstrapping functionality of the bootstrapping mechanism to be performed by device 102, e.g., as described below.

In some demonstrative aspects, the second P2P frame may include a second bootstrapping functionality indication to indicate a second bootstrapping functionality of the bootstrapping mechanism to be performed by device 140, e.g., as described below.

In some demonstrative aspects, one of the first and second P2P frames may include a P2P provision discovery request, and another one of the first and second P2P frames may include a P2P provision discovery response, e.g., as described below.

In other aspects, the first and/or second P2P frames may include any other additional or alternative type of P2P frames.

In some demonstrative aspects, the negotiated bootstrapping mechanism may be based, for example, on a pin-code pairing mechanism, e.g., as described below.

In some demonstrative aspects, the negotiated bootstrapping mechanism may be based, for example, on a passphrase pairing mechanism, e.g., as described below.

In some demonstrative aspects, the negotiated bootstrapping mechanism may be based, for example, on a Quick Response (QR) code pairing mechanism, e.g., as described below.

In some demonstrative aspects, the negotiated bootstrapping mechanism may be based, for example, on a Near Field Communication (NFC) tag pairing mechanism, e.g., as described below.

In other aspects, the negotiated bootstrapping mechanism may be based, for example, on any other additional and/or alternative pairing mechanism.

In some demonstrative aspects, the negotiated bootstrapping mechanism may include, for example, an opportunistic bootstrapping mechanism, for example, based on non-authenticated pairing, e.g., as described below.

In other aspects, the negotiated bootstrapping mechanism may include any other additional and/or alternative bootstrapping mechanism.

In one example, the negotiated bootstrapping mechanism may include a bootstrapping mechanism from one or more predefined types of bootstrapping mechanisms, for example, including one or more bootstrapping mechanisms of the following bootstrapping mechanisms, e.g., as follows:

TABLE 1

| Pairing Bootstrapping Methods | Description |
| --- | --- |
| Opportunistic bootstrapping | A pairing peer with simple user interface may rely on pushbutton or other OOB means to bootstrap the pairing setup without mutual authentication. |
| Pin-code display | Device is capable of display a pin-code (4 digits or more). |
| Passphrase display | Device is capable of display a passphrase (8-63 ASCII-encoded characters). |
| QR-code display | Device is capable of display a QR-code represented by the WIFI URI. |
| NFC Tag | Device is capable of supporting the NFC Tag. |
| Keypad (pin-code only) | Device is capable of entering a pin. |
| Keypad (passphrase) | Device is capable of entering a passphrase |
| QR-code scan | Device is capable of scan a QR-code represented by the WIFI URI. |
| NFC reader | Device is capable of supporting the NFC reader. |
| Service managed bootstrapping | The bootstrapping is entirely managed and executed by the service/application and is transparent to Wi-Fi Direct. The Service may convey bootstrapping configuration information through the Provision Discovery Request/Response messages. |
| Bootstrapping handshakes skipped | Device acquires the pairing credential (e.g. pairing SSID and password) by means out of scope of this specification and does not need the pairing bootstrapping handshakes. For example, the devices may use Bluetooth for pairing. |

In other aspects, the one or more predefined types of bootstrapping mechanisms may include any other additional and/or alternative bootstrapping mechanisms.

In some demonstrative aspects, controller 124 may be configured to control, trigger, cause, and/or instruct device 102 to derive the PMKSA, for example, by performing the second message-exchange, for example, according to a WPA protocol, e.g., as described below.

In some demonstrative aspects, controller 124 may be configured to control, trigger, cause, and/or instruct device 102 to derive the PMKSA, for example, based on a common password, which may be derived, for example, according to the bootstrapping mechanism, e.g., as described below.

In some demonstrative aspects, controller 124 may be configured to control, trigger, cause, and/or instruct device 102 to derive the PMKSA, for example, by performing the second message-exchange, for example, according to an SAE-H2E protocol, for example, based on a common password, e.g., as described below.

In some demonstrative aspects, the common password may be derived, for example, according to the bootstrapping mechanism, e.g., as described below.

In some demonstrative aspects, controller 124 may be configured to control, trigger, cause, and/or instruct device 102 to derive the PMKSA, for example, by performing the second message-exchange, for example, according to the SAE-H2E protocol, for example, based on a default Personal Information Number (PIN), e.g., as described below.

In some demonstrative aspects, controller 124 may be configured to control, trigger, cause, and/or instruct device 102 to derive the PMKSA, for example, by performing the second message-exchange, for example, according to the OWE protocol, e.g., as described below.

In some demonstrative aspects, controller 124 may be configured to control, trigger, cause, and/or instruct device 102 to derive the PMKSA, for example, by performing the second message-exchange, for example, using ephemeral keys without mutual authentication, e.g., as described below.

In other aspects, controller 124 may be configured to control, trigger, cause, and/or instruct device 102 to derive the PMKSA, for example, based on any other additional and/or alternative mechanism, method, and/or protocol.

In some demonstrative aspects, the third message exchange may include a message exchange of a 4-way handshake with device 140, for example, based on the PMKSA, e.g., as described below.

In some demonstrative aspects, the third message exchange may include a message exchange of a Pre-Association Security Negotiation (PASN) with device 140, for example, based on the PMKSA, e.g., as described below.

In other aspects, the third message exchange may include any other additional and/or alternative message exchange, e.g., based on the PMKSA.

In some demonstrative aspects, device 102 and/or device 140 may be configured to implement one or more operations and/or functionalities of pairing and provisioning protocol, which may utilize bootstrapping for two P2P devices, for example, to possess a common password, e.g., as described below.

For example, the pairing and provisioning protocol may define that the bootstrapping may be triggered, for example, by an Out-of-Band (OOB) method, for example, before a P2P Discovery, or after the P2P Discovery.

In one example, the pairing and provisioning protocol may define that the bootstrapping may be triggered, for example, after the P2P discovery, for example, when the bootstrapping is not performed before the P2P discovery.

In some demonstrative aspects, device 102 and/or device 140 may be configured to decide and select a bootstrapping method, for example, before starting the bootstrapping.

In some demonstrative aspects, device 102 and device 140 may be configured to exchange one or more frames, e.g., a P2P provision discovery request frame and/or a P2P provision discovery response frame, for example, to negotiate and/or select the bootstrapping method, e.g., as described below.

In some demonstrative aspects, the pairing and provisioning protocol may define a Pairwise Master Key (PMK), derivation process derive a PMK for the P2P device, for example, after the bootstrapping.

In some demonstrative aspects, the pairing and provisioning protocol may define that an SAE-H2E protocol may be used to derive a PMK, e.g., a PMKSA, for example, in case the two P2P devices possess a common password based on the bootstrapping.

In some demonstrative aspects, the pairing and provisioning protocol may define that the SAE-H2E protocol may be used with a default PIN to derive a PMK, for example, in case the two P2P devices do not possess a common password, e.g., when a push button bootstrapping method is used.

In some demonstrative aspects, the pairing and provisioning protocol may define that an OWE protocol may be used to derive the PMK, for example, in case the two P2P devices do not possess a common password, e.g., when a push button bootstrapping method is used.

Figure 2:
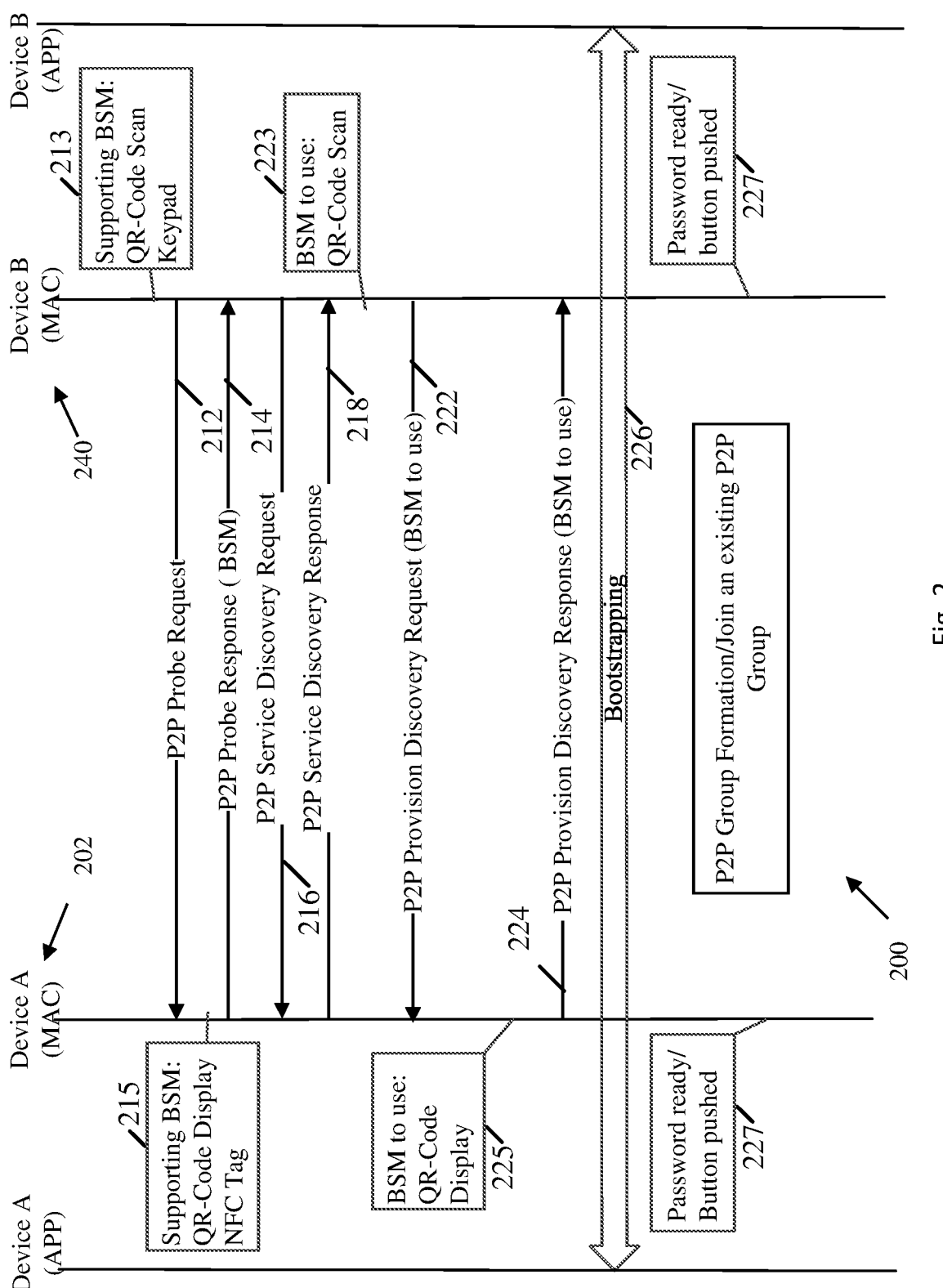
FIG. 2 is a schematic illustration of a sequence diagram of operations and communications between a first Peer-to-Peer (P2P) device and a second P2P device to negotiate a bootstrapping mechanism, in accordance with some demonstrative aspects.

Reference is made to FIG. 2, which schematically illustrates a sequence diagram 200 of operations and communications between a first P2P device 202 and a second P2P device 240 to negotiate a bootstrapping mechanism, in accordance with some demonstrative aspects.

In one example, device 102 (FIG. 1) may include P2P device 202, and/or may perform one or more operations and/or functionalities of P2P device 202; and/or device 140 (FIG. 1) may include P2P device 240, and/or may perform one or more operations and/or functionalities of P2P device 240.

In some demonstrative aspects, a P2P device, e.g., device 102 (FIG. 1) and/or device 140 (FIG. 1), may implement one or more operations and/or communications of FIG. 2, for example, to negotiate a bootstrapping mechanism.

In some demonstrative aspects, as shown in FIG. 2, device 202 and device 240 may exchange a P2P probe request 212, and a P2P probe response 214, e.g., in response to the P2P probe request 212.

In some demonstrative aspects, as shown in FIG. 2, P2P probe request 212 may include supported bootstrapping functionality information 213 to indicate one or more bootstrapping functionalities supported by device 240.

In one example, as shown in FIG. 2, device 240 may support a QR-code scan pairing mechanism, and a pin-code keypad pairing mechanism.

In some demonstrative aspects, as shown in FIG. 2, P2P probe response 214 may include supported bootstrapping functionality information 215 to indicate bootstrapping functionalities supported by device 202.

In one example, as shown in FIG. 2, device 202 may support a QR-code display pairing mechanism and an NFC tag pairing mechanism.

In some demonstrative aspects, as shown in FIG. 2, device 202 and device 240 may exchange a P2P service discovery request 216, and a P2P service discovery response 218, e.g., in response to the P2P service discovery request 216.

In some demonstrative aspects, as shown in FIG. 2, device 202 and device 240 may exchange a P2P provision discovery request 222, and a P2P provision discovery response 224, e.g., in response to the P2P provision discovery request 222.

In some demonstrative aspects, as shown in FIG. 2, P2P provision discovery request 222 may include a bootstrapping indication 223 to indicate a negotiated bootstrapping mechanism to be performed by device 240.

In one example, as shown in FIG. 2, device 240 may select to perform the bootstrapping according to the QR-code scan pairing mechanism.

In some demonstrative aspects, as shown in FIG. 2, P2P provision discovery response 224 may include a bootstrapping indication 225 to indicate a negotiated bootstrapping mechanism to be performed by device 202.

In one example, as shown in FIG. 2, device 202 may select to perform the bootstrapping according to the QR-code display pairing mechanism.

In some demonstrative aspects, as shown in FIG. 2, device 202 and device 240 may perform bootstrapping 226, for example, according to the negotiated bootstrapping mechanism.

In some demonstrative aspects, as shown in FIG. 2, device 202 and device 240 may possess a common password 227, for example, after the bootstrapping 226.

In some demonstrative aspects, device 202 and device 240 may not possess a common password 227, for example, if the bootstrapping 226 includes a push-button bootstrapping mechanism.

Figure 3:
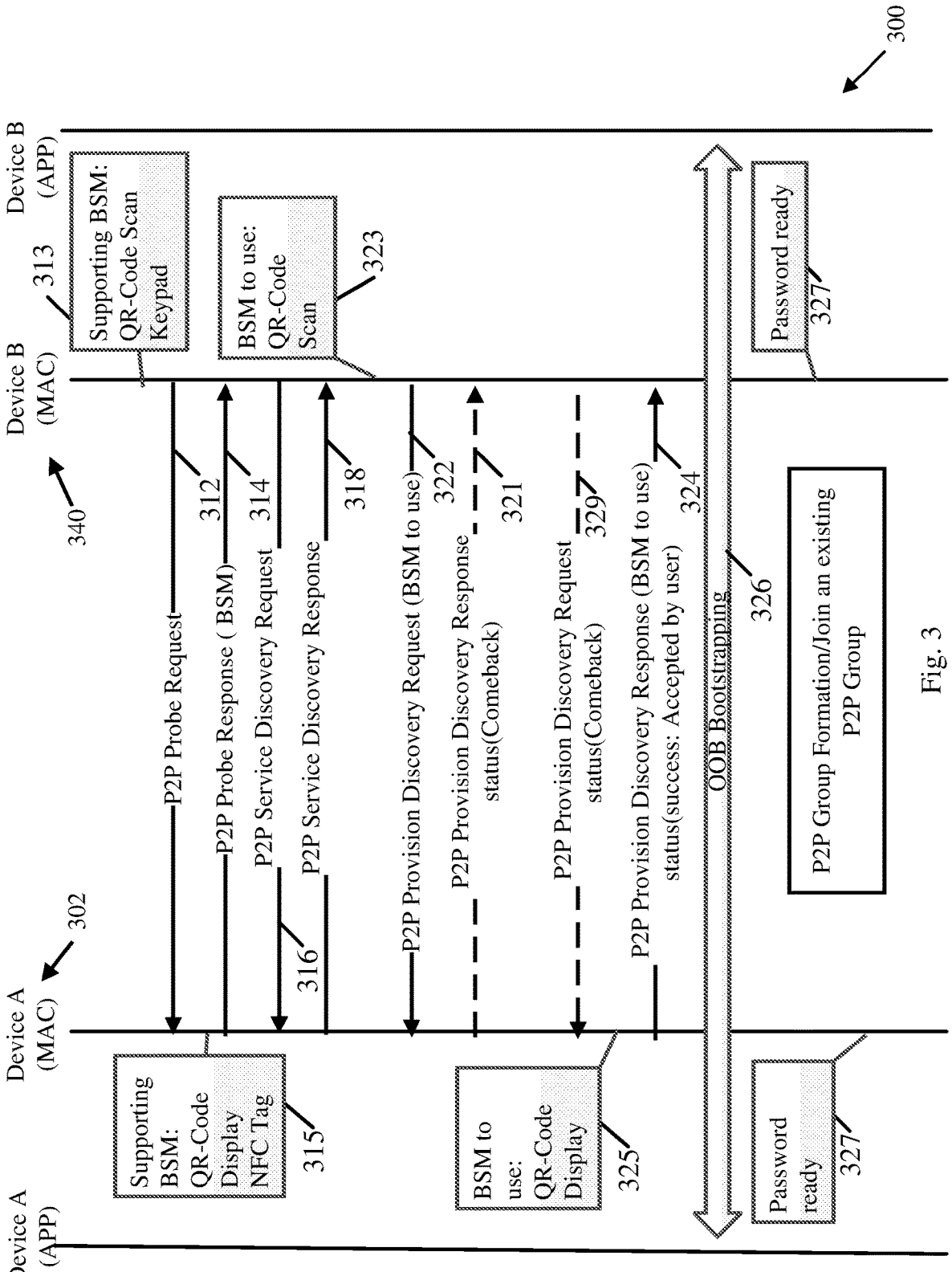
FIG. 3 is a schematic illustration of a sequence diagram of operations and communications between a first P2P device and a second P2P device to negotiate a bootstrapping mechanism, in accordance with some demonstrative aspects.

Reference is made to FIG. 3, which schematically illustrates a sequence diagram 300 of operations and communications between a first P2P device 302 and a second P2P device 340 to negotiate a bootstrapping mechanism, in accordance with some demonstrative aspects.

In one example, device 102 (FIG. 1) may include P2P device 302, and/or may perform one or more operations and/or functionalities of P2P device 302; and/or device 140 (FIG. 1) may include P2P device 340, and/or may perform one or more operations and/or functionalities of P2P device 340.

In some demonstrative aspects, a P2P device, e.g., device 102 (FIG. 1) and/or device 140 (FIG. 1), may implement one or more operations and/or communications of FIG. 3, for example, to negotiate a bootstrapping mechanism.

In some demonstrative aspects, as shown in FIG. 3, device 302 and device 340 may exchange a P2P probe request 312, and a P2P probe response 314, e.g., in response to the P2P probe request 312.

In some demonstrative aspects, as shown in FIG. 3, P2P probe request 312 may include supported bootstrapping functionality information 313 to indicate one or more bootstrapping functionalities supported by device 340.

In one example, as shown in FIG. 3, device 340 may support a QR-code scan pairing mechanism, and a pin-code keypad pairing mechanism.

In some demonstrative aspects, as shown in FIG. 3, P2P probe response 314 may include supported bootstrapping functionality information 315 to indicate bootstrapping functionalities supported by device 302.

In one example, as shown in FIG. 3, device 302 may support a QR-code display pairing mechanism and an NFC tag pairing mechanism.

In some demonstrative aspects, as shown in FIG. 3, device 302 and device 340 may exchange a P2P service discovery request 316, and a P2P service discovery response 318, e.g., in response to the P2P service discovery request 316.

In some demonstrative aspects, as shown in FIG. 3, device 302 and device 340 may exchange a P2P provision discovery request 322, and a P2P provision discovery response 321, e.g., in response to the P2P provision discovery request 322.

In some demonstrative aspects, as shown in FIG. 3, P2P provision discovery request 322 may include a bootstrapping indication 323 to indicate a negotiated bootstrapping mechanism to be performed by device 340.

In one example, as shown in FIG. 3, device 340 may select to perform the bootstrapping according to the QR-code scan pairing mechanism.

In some demonstrative aspects, as shown in FIG. 3, P2P provision discovery response 321 may include a comeback request to request device 340 to transmit another P2P provision discovery request 329, e.g., later in time, for example, as device 302 awaits for a user input.

In some demonstrative aspects, as shown in FIG. 3, device 302 and device 340 may exchange the P2P provision discovery request 329, and a P2P provision discovery response 324, e.g., in response to the P2P provision discovery request 329.

In some demonstrative aspects, as shown in FIG. 3, P2P provision discovery response 324 may include a bootstrapping indication 325 to indicate a negotiated bootstrapping mechanism to be performed by device 302, for example, based on a received user input.

In one example, as shown in FIG. 3, device 302 may select to perform the bootstrapping according to the QR-code display pairing mechanism.

In some demonstrative aspects, as shown in FIG. 3, device 302 and device 340 may perform bootstrapping 326, for example, according to the negotiated bootstrapping mechanism.

In some demonstrative aspects, as shown in FIG. 3, device 302 and device 340 may possess a common password 327, for example, after the bootstrapping 326.

Figure 4:
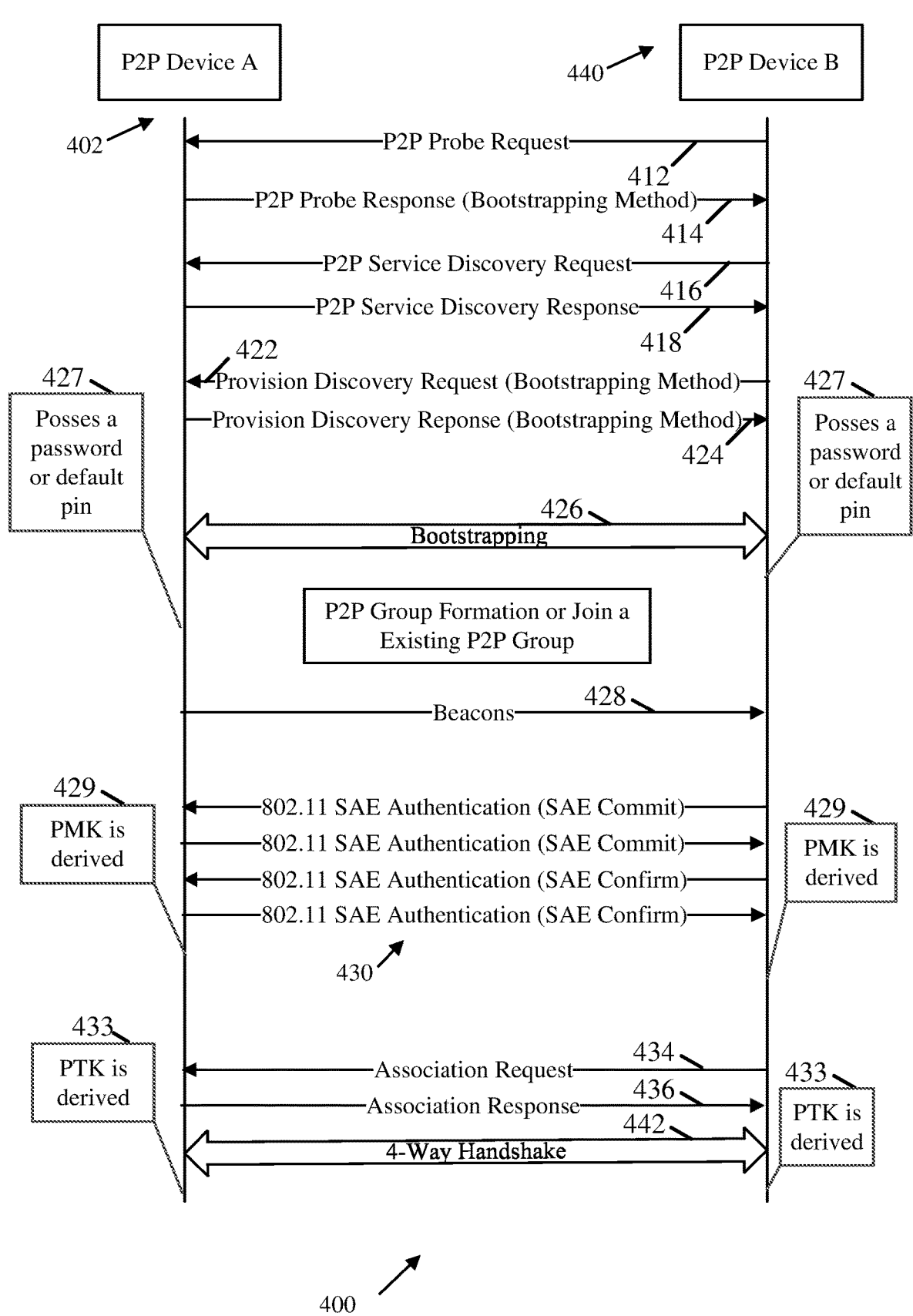
FIG. 4 is a schematic illustration of a sequence diagram of operations and communications between a first P2P device and a second P2P device to encrypt a P2P communication between the first P2P device and the second P2P device, in accordance with some demonstrative aspects.

Reference is made to FIG. 4, which schematically illustrates a sequence diagram 400 of operations and communications between a first P2P device 402 and a second P2P device 440 to encrypt a P2P communication between P2P device 402 and P2P device 440, in accordance with some demonstrative aspects.

In one example, device 102 (FIG. 1) may include P2P device 402, and/or may perform one or more operations and/or functionalities of P2P device 402; and/or device 140 (FIG. 1) may include P2P device 440, and/or may perform one or more operations and/or functionalities of P2P device 440.

In some demonstrative aspects, device 102 (FIG. 1) and/or device 140 (FIG. 1), may implement one or more operations and/or communications of FIG. 4, for example, to encrypt P2P communication between device 102 (FIG. 1) and device 140 (FIG. 1).

In some demonstrative aspects, device 102 (FIG. 1) and/or device 140 (FIG. 1) may implement the one or more operations and/or communications of FIG. 4, for example, according to the SME mechanism.

In some demonstrative aspects, as shown in FIG. 4, device 402 and device 440 may exchange a P2P probe request 412, and a P2P probe response 414, e.g., in response to the P2P probe request 412.

In some demonstrative aspects, P2P probe request 412 may include supported bootstrapping functionality information to indicate bootstrapping functionalities supported by device 440.

In some demonstrative aspects, P2P probe response 414 may include supported bootstrapping functionality information to indicate bootstrapping functionalities supported by device 402.

In some demonstrative aspects, as shown in FIG. 4, device 402 and device 440 may exchange a P2P service discovery request 416, and a P2P service discovery response 418, e.g., in response to the P2P service discovery request 416.

In some demonstrative aspects, as shown in FIG. 4, device 402 and device 440 may exchange a P2P provision discovery request 422, and a P2P provision discovery response 424, e.g., in response to the P2P provision discovery request 422.

In some demonstrative aspects, P2P provision discovery request 422 may include a bootstrapping indication to indicate a negotiated bootstrapping mechanism to be performed by device 440.

In some demonstrative aspects, P2P provision discovery response 424 may include a bootstrapping indication to indicate a negotiated bootstrapping mechanism to be performed by device 402.

In some demonstrative aspects, as shown in FIG. 4, device 402 and device 440 may perform bootstrapping 426, for example, according to the negotiated bootstrapping mechanism.

In some demonstrative aspects, as shown in FIG. 4, device 402 and device 440 may possess a common password 427, which may be utilized for performing operations of an SAE mechanism, for example, after the bootstrapping mechanism 426.

In some demonstrative aspects, as shown in FIG. 4, device 402 and device 440 may utilize a default PIN for performing operations of the SAE mechanism, for example, in case device 402 and device 440 do not possess a common password 427, for example, after the bootstrapping mechanism 426.

In some demonstrative aspects, as shown in FIG. 4, device 402 may transmit one or more beacons 428, which may be received by device 440.

In some demonstrative aspects, as shown in FIG. 4, device 402 and device 440 may derive a Pairwise Master Key (PMK) 431, e.g., a PMKSA, for example, based on an exchange of SAE messages 430, e.g., four SAE messages 430, for example, according to an SAE protocol, e.g. an SAE-H2E protocol.

In some demonstrative aspects, the SAE protocol, e.g. the SAE-H2E protocol may be performed, for example, based on the common password 427.

In some demonstrative aspects, the SAE protocol, e.g. the SAE-H2E protocol may be performed, for example, based on the default PIN, for example, in case device 402 and device 440 do not possess a common password 427, for example, after the bootstrapping mechanism 426.

In some demonstrative aspects, as shown in FIG. 4, device 402 and device 440 may exchange an association request 434, and an association response 436, e.g., in response to the association request 434.

In some demonstrative aspects, as shown in FIG. 4, device 402 and device 440 may derive an encryption key 433, e.g., a Pairwise Token Key (PTK), for example, based on a 4-way handshake 442 between device 402 and device 440. For example, the 4-way handshake 442 may be based on the PMK 429.

Figure 5:
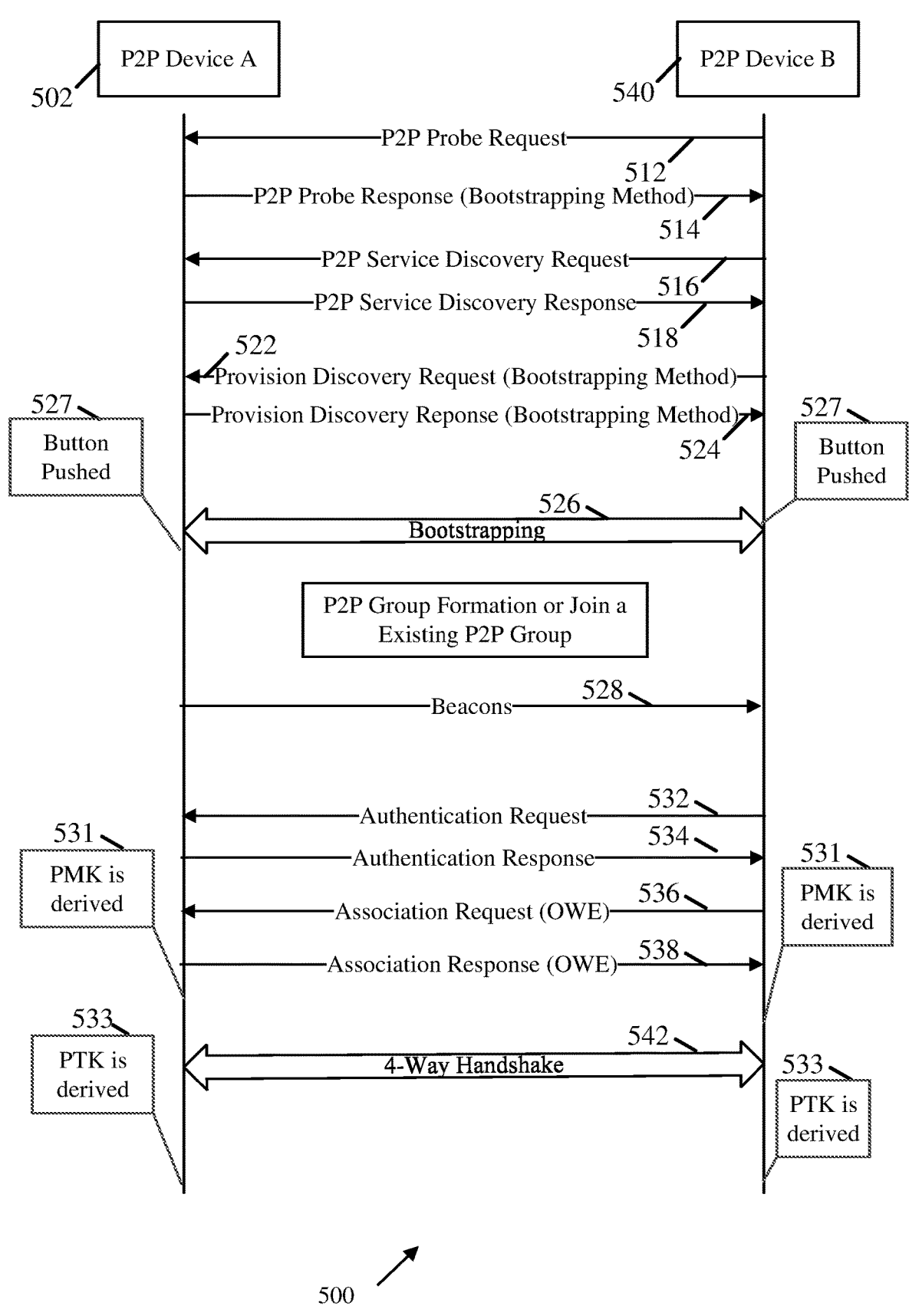
FIG. 5 is a schematic illustration of a sequence diagram of operations and communications between a first P2P device and a second P2P device to encrypt a P2P communication between the first P2P device and the second P2P device, in accordance with some demonstrative aspects.

Reference is made to FIG. 5, which schematically illustrates a sequence diagram 500 of operations and communications between a first P2P device 502 and a second P2P device 540 to encrypt a P2P communication between P2P device 502 and P2P device 540, in accordance with some demonstrative aspects.

In one example, device 102 (FIG. 1) may include P2P device 502, and/or may perform one or more operations and/or functionalities of P2P device 502; and/or device 140 (FIG. 1) may include P2P device 540, and/or may perform one or more operations and/or functionalities of P2P device 540.

In some demonstrative aspects, device 102 (FIG. 1) and/or device 140 (FIG. 1), may implement one or more operations and/or communications of FIG. 5, for example, to encrypt P2P communication between device 102 (FIG. 1) and device 140 (FIG. 1).

In some demonstrative aspects, device 102 (FIG. 1) and/or device 140 (FIG. 1) may implement the one or more operations and/or communications of FIG. 5, for example, to encrypt the P2P communication between device 102 (FIG. 1) and device 140 (FIG. 1), for example, based on an OWE mechanism.

In some demonstrative aspects, device 102 (FIG. 1) and/or device 140 (FIG. 1) may implement the one or more operations and/or communications of FIG. 5, for example, utilizing an OWE mechanism for derive a PMK, for example, when device 102 (FIG. 1) and device 140 (FIG. 1) do not possess a common password, e.g., in case a button pushed bootstrapping mechanism is implemented.

In some demonstrative aspects, as shown in FIG. 5, device 502 and device 540 may exchange a P2P probe request 512, and a P2P probe response 514, e.g., in response to the P2P probe request 512.

In some demonstrative aspects, P2P probe request 512 may include supported bootstrapping functionality information to indicate bootstrapping functionalities supported by device 540.

In some demonstrative aspects, P2P probe response 514 may include supported bootstrapping functionality information to indicate bootstrapping functionalities supported by device 502.

In some demonstrative aspects, as shown in FIG. 5, device 502 and device 540 may exchange a P2P service discovery request 516, and a P2P service discovery response 518, e.g., in response to the P2P service discovery request 516.

In some demonstrative aspects, as shown in FIG. 5, device 502 and device 540 may exchange a P2P provision discovery request 522, and a P2P provision discovery response 524, e.g., in response to the P2P provision discovery request 522.

In some demonstrative aspects, P2P provision discovery request 522 may include a bootstrapping indication to indicate a negotiated bootstrapping mechanism to be performed by device 540.

In some demonstrative aspects, P2P provision discovery response 524 may include a bootstrapping indication to indicate a negotiated bootstrapping mechanism to be performed by device 540.

In some demonstrative aspects, as shown in FIG. 5, device 502 and device 540 may perform a bootstrapping mechanism 526, for example, according to the negotiated bootstrapping mechanism.

In some demonstrative aspects, as shown in FIG. 5, device 502 and device 540 may not possess a common password, for example, after the bootstrapping mechanism 526. For example, as shown in FIG. 5, device 502 and 540 may perform the bootstrapping according to a button-pushed bootstrapping mechanism.

In some demonstrative aspects, as shown in FIG. 5, device 502 may transmit one or more beacons 528, which may be received by device 540.

In some demonstrative aspects, as shown in FIG. 5, device 502 and device 540 may exchange an authentication request 532, and an authentication response 534, e.g., in response to the authentication request 532.

In some demonstrative aspects, as shown in FIG. 5, device 502 and device 540 may exchange an OWE association request 536, and an OWE association response 538, e.g., in response to the OWE association request 536.

In some demonstrative aspects, the OWE association request 536 and the OWE association response 536 may be according to an OWE protocol.

In some demonstrative aspects, as shown in FIG. 5, device 502 and device 540 may derive a PMK 531, e.g., a PMKSA, based on the OWE association request 536 and the OWE association response 538, which may be exchanged according to the OWE protocol.

In some demonstrative aspects, as shown in FIG. 5, device 502 and device 540 may derive an encryption key 533, e.g., a PTK, for example, based on a 4-way handshake 542 between device 502 and device 540. For example, the 4-way handshake 542 may be based on the PMK 531.

Reference is made to FIG. 6, which schematically illustrates a method of P2P communication, in accordance with some demonstrative aspects. For example, one or more of the operations of the method of FIG. 6 may be performed by one or more elements of a system, e.g., system 100 (FIG. 1), for example, one or more wireless devices, e.g., device 102 (FIG. 1), device 140 (FIG. 1), and/or a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 602, the method may include determining, at a first wireless communication device, a negotiated bootstrapping mechanism, for example, based on a first message-exchange including P2P messages exchanged with a second wireless communication device. For example, controller 124 (FIG. 1) may be configured to cause, trigger, and/or control device 102 (FIG. 1) to determine the negotiated bootstrapping mechanism based on the first message-exchange including the P2P messages exchanged with device 140 (FIG. 1), e.g., as described above.

As indicated at block 604, the method may include pairing the first wireless communication device with the second wireless communication device according to the negotiated bootstrapping mechanism. For example, controller 124 (FIG. 1) may be configured to cause, trigger, and/or control device 102 (FIG. 1) to pair device 102 (FIG. 1) with device 140 (FIG. 1) according to the negotiated bootstrapping mechanism, e.g., as described above.

As indicated at block 606, the method may include deriving a PMKSA based on a second message-exchange with the second wireless communication device after pairing with the second wireless communication device. For example, controller 124 (FIG. 1) may be configured to cause, trigger, and/or control device 102 (FIG. 1) to derive the PMKSA based on the second message-exchange with device 140 (FIG. 1) after pairing with 140 (FIG. 1), e.g., as described above.

As indicated at block 608, the method may include determining an encryption key according to a third message exchange with the second wireless communication device based on the PMKSA, the encryption key configured to encrypt a P2P communication with the second wireless communication device. For example, controller 124 (FIG. 1) may be configured to cause, trigger, and/or control device 102 (FIG. 1) to determine the encryption key according to the third message exchange with device 140 (FIG. 1) based on the PMKSA, e.g., as described above.

Figure 7:
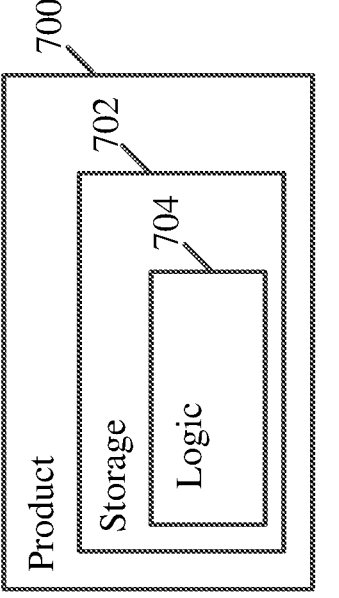
FIG. 7 is a schematic illustration of a product of manufacture, in accordance with some demonstrative aspects.

Reference is made to FIG. 7, which schematically illustrates a product of manufacture 700, in accordance with some demonstrative aspects. Product 700 may include one or more tangible computer-readable ("machine-readable") non-transitory storage media 702, which may include computer-executable instructions, e.g., implemented by logic 704, operable to, when executed by at least one computer processor, enable the at least one computer processor to implement one or more operations at device 102 (FIG. 1), device 140 (FIG. 1), controller 124 (FIG. 1), controller 154 (FIG. 1), message processor 128 (FIG. 1), message processor 158 (FIG. 1), radio 114 (FIG. 1), radio 144 (FIG. 1), transmitter 118 (FIG. 1), transmitter 148 (FIG. 1), receiver 116 (FIG. 1), and/or receiver 146 (FIG. 1); to cause device 102 (FIG. 1), device 140 (FIG. 1), controller 124 (FIG. 1), controller 154 (FIG. 1), message processor 128 (FIG. 1), message processor 158 (FIG. 1), radio 114 (FIG. 1), radio 144 (FIG. 1), transmitter 118 (FIG. 1), transmitter 148 (FIG. 1), receiver 116 (FIG. 1), and/or receiver 146 (FIG. 1) to perform, trigger and/or implement one or more operations and/or functionalities; and/or to perform, trigger and/or implement one or more operations and/or functionalities described with reference to the FIGS. 1-6, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 700 and/or machine readable storage media 702 may include one or more types of computer-readable storage media capable of storing data, including volatile memory, non-volatile memory, removable or non-removable memory, erasable or non-erasable memory, writeable or re-writeable memory, and the like. For example, machine readable storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EE-PROM), flash memory (e.g., NOR or NAND flash memory), content addressable memory (CAM), polymer memory, phase-change memory, ferroelectric memory, silicon-oxide-nitride-oxide-silicon (SONOS) memory, a hard drive, an optical disk, a magnetic disk, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

Examples

The following examples pertain to further aspects.

Example 1 includes an apparatus comprising logic and circuitry configured to cause a first wireless communication device to determine a negotiated bootstrapping mechanism based on a first message-exchange comprising Peer-to-Peer (P2P) messages exchanged with a second wireless communication device; pair the first wireless communication device with the second wireless communication device according to the negotiated bootstrapping mechanism; derive a Pairwise Master Key Security Association (PMKSA) based on a second message-exchange with the second wireless communication device after pairing with the second wireless communication device; and determine an encryption key according to a third message exchange with the second wireless communication device based on the PMKSA, the encryption key configured to encrypt a P2P communication with the second wireless communication device.

Example 2 includes the subject matter of Example 1, and optionally, wherein the first message-exchange comprises a first P2P frame from the first wireless communication device and a second P2P frame from the second wireless communication device, wherein the first P2P frame comprises first supported bootstrapping functionality information to indicate one or more first bootstrapping functionalities supported by the first wireless communication device, wherein the second P2P frame comprises second supported bootstrapping functionality information to indicate one or more second bootstrapping functionalities supported by the second wireless communication device.

Example 3 includes the subject matter of Example 2, and optionally, wherein the apparatus is configured to cause the first wireless communication device to determine the negotiated bootstrapping mechanism based on a match between a first identified bootstrapping functionality of the one or more first bootstrapping functionalities and a second identified bootstrapping functionality of the one or more second bootstrapping functionalities.

Example 4 includes the subject matter of Example 2 or 3, and optionally, wherein one of the first P2P frame or the second P2P frame comprises a P2P probe request, and another one of the first P2P frame or the second P2P frame comprises a P2P probe response.

Example 5 includes the subject matter of any one of Examples 1-4, and optionally, wherein the first message-exchange comprises a first P2P frame from the first wireless communication device and a second P2P frame from the second wireless communication device, wherein the first P2P frame comprises a first bootstrapping functionality indication to indicate a first bootstrapping functionality of the bootstrapping mechanism to be performed by the first wireless communication device, wherein the second P2P frame comprises a second bootstrapping functionality indication to indicate a second bootstrapping functionality of the bootstrapping mechanism to be performed by the second wireless communication device.

Example 6 includes the subject matter of Example 5, and optionally, wherein one of the first P2P frame or the second P2P frame comprises a P2P provision discovery request, and another one of the first P2P frame or the second P2P frame comprises a P2P provision discovery response.

Example 7 includes the subject matter of any one of Examples 1-6, and optionally, wherein the apparatus is configured to cause the first wireless communication device to derive the PMKSA based on a common password, which is derived according to the bootstrapping mechanism.

Example 8 includes the subject matter of any one of Examples 1-6, and optionally, wherein the apparatus is configured to cause the first wireless communication device to derive the PMKSA by performing the second message-exchange according to a Simultaneous Authentication of Equals (SAE) with SAE Hash-to-Element (H2E) (SAE-H2E) protocol based on a common password, which is derived according to the bootstrapping mechanism.

Example 9 includes the subject matter of any one of Examples 1-6, and optionally, wherein the apparatus is configured to cause the first wireless communication device to derive the PMKSA by performing the second message-exchange according to a Simultaneous Authentication of Equals (SAE) with Hash-to-Element (H2E) (SAE-H2E) protocol based on a default Personal Information Number (PIN).

Example 10 includes the subject matter of any one of Examples 1-6, and optionally, wherein the apparatus is configured to cause the first wireless communication device to derive the PMKSA by performing the second message-exchange according to an Opportunistic Wireless Encryption (OWE) protocol.

Example 11 includes the subject matter of any one of Examples 1-6, and optionally, wherein the apparatus is configured to cause the first wireless communication device to derive the PMKSA by performing the second message-exchange using ephemeral keys without mutual authentication.

Example 12 includes the subject matter of any one of Examples 1-6, and optionally, wherein the apparatus is configured to cause the first wireless communication device to derive the PMKSA by performing the second message-exchange according to a Wi-Fi Protected Access (WPA) protocol.

Example 13 includes the subject matter of any one of Examples 1-12, and optionally, wherein the first message-exchange comprises a first public action frame from the first wireless communication device, and a second public action frame from the second wireless communication device.

Example 14 includes the subject matter of any one of Examples 1-13, and optionally, wherein the negotiated boot-strapping mechanism is based on at least one of a pin-code pairing mechanism, a passphrase pairing mechanism, a Quick Response (QR) code pairing mechanism, or a Near Field Communication (NFC) tag pairing mechanism.

Example 15 includes the subject matter of any one of Examples 1-14, and optionally, wherein the negotiated boot-strapping mechanism comprises an opportunistic bootstrap-ping mechanism based on non-authenticated pairing.

Example 16 includes the subject matter of any one of Examples 1-15, and optionally, wherein the third message exchange comprises a message exchange of a 4-way hand-shake with the second wireless communication device based on the PMKSA.

Example 17 includes the subject matter of any one of Examples 1-15, and optionally, wherein the third message exchange comprises a message exchange of a Pre-Associa-tion Security Negotiation (PASN) with the second wireless communication device based on the PMKSA.

Example 18 includes the subject matter of any one of Examples 1-17, and optionally, comprising a radio to com-municate messages of the first and second message exchanges.

Example 19 includes the subject matter of Example 18, and optionally, comprising one or more antennas connected to the radio, and a processor to execute instructions of an operating system of the first wireless communication device.

Example 20 comprises a wireless communication device comprising the apparatus of any of Examples 1-19.

Example 21 comprises an apparatus comprising means for executing any of the described operations of any of Examples 1-19.

Example 22 comprises a product comprising one or more tangible computer-readable non-transitory storage media comprising instructions operable to, when executed by at least one processor, enable the at least one processor to cause a wireless communication device to perform any of the described operations of any of Examples 1-19.

Example 23 comprises an apparatus comprising: a memory interface; and processing circuitry configured to: perform any of the described operations of any of Examples 1-19.

Example 24 comprises a method comprising any of the described operations of any of Examples 1-19.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:

a processor configured to cause a first wireless commu-nication device to:

determine a negotiated bootstrapping mechanism from a plurality of bootstrapping mechanisms based on a first message-exchange with a second wireless com-munication device, the first message-exchange com-prises a first Peer-to-Peer (P2P) frame from the first wireless communication device and a second P2P frame from the second wireless communication device, the first P2P frame comprises first supported bootstrapping functionality information to indicate one or more first bootstrapping functionalities sup-ported by the first wireless communication device, the second P2P frame comprises second supported bootstrapping functionality information to indicate one or more second bootstrapping functionalities supported by the second wireless communication device;

after determination of the negotiated bootstrapping mechanism, pair the first wireless communication device with the second wireless communication device according to the negotiated bootstrapping mechanism;

derive a Pairwise Master Key Security Association (PMKSA) based on a second message-exchange with the second wireless communication device after pairing with the second wireless communication device; and determine an encryption key according to a third message exchange with the second wireless communication device based on the PMKSA, the encryption key configured to encrypt a P2P communication with the second wireless communication device; and a memory to store information processed by the processor.

2. The apparatus of claim 1 configured to cause the first wireless communication device to determine the negotiated bootstrapping mechanism based on a match between a first identified bootstrapping functionality of the one or more first bootstrapping functionalities and a second identified bootstrapping functionality of the one or more second bootstrapping functionalities.

3. The apparatus of claim 1, wherein one of the first P2P frame or the second P2P frame comprises a P2P probe request, and another one of the first P2P frame or the second P2P frame comprises a P2P probe response.

4. The apparatus of claim 1, wherein the first P2P frame comprises a first bootstrapping functionality indication to indicate a first bootstrapping functionality of the bootstrapping mechanism to be performed by the first wireless communication device, wherein the second P2P frame comprises a second bootstrapping functionality indication to indicate a second bootstrapping functionality of the bootstrapping mechanism to be performed by the second wireless communication device.

5. The apparatus of claim 4, wherein one of the first P2P frame or the second P2P frame comprises a P2P provision discovery request, and another one of the first P2P frame or the second P2P frame comprises a P2P provision discovery response.

6. The apparatus of claim 1 configured to cause the first wireless communication device to derive the PMKSA based on a common password, which is derived according to the negotiated bootstrapping mechanism.

7. The apparatus of claim 1 configured to cause the first wireless communication device to derive the PMKSA by performing the second message-exchange according to a Simultaneous Authentication of Equals (SAE) with SAE Hash-to-Element (H2E) (SAE-H2E) protocol based on a common password, which is derived according to the negotiated bootstrapping mechanism.

8. The apparatus of claim 1 configured to cause the first wireless communication device to derive the PMKSA by performing the second message-exchange according to a Simultaneous Authentication of Equals (SAE) with Hash-to-Element (H2E) (SAE-H2E) protocol based on a default Personal Information Number (PIN).

9. The apparatus of claim 1 configured to cause the first wireless communication device to derive the PMKSA by performing the second message-exchange according to an Opportunistic Wireless Encryption (OWE) protocol.

10. The apparatus of claim 1 configured to cause the first wireless communication device to derive the PMKSA by performing the second message-exchange using ephemeral keys without mutual authentication.

11. The apparatus of claim 1 configured to cause the first wireless communication device to derive the PMKSA by performing the second message-exchange according to a Wi-Fi Protected Access (WPA) protocol.

12. The apparatus of claim 1, wherein the first message-exchange comprises a first public action frame from the first wireless communication device, and a second public action frame from the second wireless communication device.

13. The apparatus of claim 1, wherein the negotiated bootstrapping mechanism is based on at least one of a pin-code pairing mechanism, a passphrase pairing mechanism, a Quick Response (QR) code pairing mechanism, or a Near Field Communication (NFC) tag pairing mechanism.

14. The apparatus of claim 1, wherein the negotiated bootstrapping mechanism comprises an opportunistic bootstrapping mechanism based on non-authenticated pairing.

15. The apparatus of claim 1, wherein the third message exchange comprises a message exchange of a 4-way handshake with the second wireless communication device based on the PMKSA.

16. The apparatus of claim 1, wherein the third message exchange comprises a message exchange of a Pre-Association Security Negotiation (PASN) with the second wireless communication device based on the PMKSA.

17. The apparatus of claim 1 comprising a radio to communicate messages of the first, second and third message exchanges.

18. The apparatus of claim 17 comprising one or more antennas connected to the radio, and another processor to execute instructions of an operating system of the first wireless communication device.

19. A product comprising one or more tangible computer-readable non-transitory storage media comprising instructions operable to, when executed by at least one processor, enable the at least one processor to cause a first wireless communication device to:

determine a negotiated bootstrapping mechanism from a plurality of bootstrapping mechanisms based on a first message-exchange with a second wireless communication device, the first message-exchange comprises a first Peer-to-Peer (P2P) frame from the first wireless communication device and a second P2P frame from the second wireless communication device, the first P2P frame comprises first supported bootstrapping functionality information to indicate one or more first bootstrapping functionalities supported by the first wireless communication device, the second P2P frame comprises second supported bootstrapping functionality information to indicate one or more second bootstrapping functionalities supported by the second wireless communication device;

after determination of the negotiated bootstrapping mechanism, pair the first wireless communication device with the second wireless communication device according to the negotiated bootstrapping mechanism;

derive a Pairwise Master Key Security Association (PMKSA) based on a second message-exchange with the second wireless communication device after pairing with the second wireless communication device; and determine an encryption key according to a third message exchange with the second wireless communication device based on the PMKSA, the encryption key configured to encrypt a P2P communication with the second wireless communication device.

20. The product of claim 19, wherein the negotiated bootstrapping mechanism is based on at least one of a pin-code pairing mechanism, a passphrase pairing mechanism, a Quick Response (OR) code pairing mechanism, or a Near Field Communication (NFC) tag pairing mechanism.

21. The product of claim 19, wherein the instructions, when executed, cause the first wireless communication device to determine the negotiated bootstrapping mechanism based on a match between a first identified bootstrapping functionality of the one or more first bootstrapping functionalities and a second identified bootstrapping functionality of the one or more second bootstrapping functionalities.

22. The product of claim 19, wherein the first P2P frame comprises a first bootstrapping functionality indication to indicate a first bootstrapping functionality of the bootstrapping mechanism to be performed by the first wireless communication device, wherein the second P2P frame comprises a second bootstrapping functionality indication to indicate a second bootstrapping functionality of the bootstrapping mechanism to be performed by the second wireless communication device.

23. An apparatus for a first wireless communication device, the apparatus comprising:

processing means for determining a negotiated bootstrapping mechanism from a plurality of bootstrapping mechanisms based on a first message-exchange with a second wireless communication device, the first message-exchange comprises a first Peer-to-Peer (P2P) frame from the first wireless communication device and a second P2P frame from the second wireless communication device, the first P2P frame comprises first supported bootstrapping functionality information to indicate one or more first bootstrapping functionalities supported by the first wireless communication device, the second P2P frame comprises second supported bootstrapping functionality information to indicate one or more second bootstrapping functionalities supported by the second wireless communication device;

processing means for causing the first wireless communication device to, after determination of the negotiated bootstrapping mechanism, pair with the second wireless communication device according to the negotiated bootstrapping mechanism;

processing means for deriving a Pairwise Master Key Security Association (PMKSA) based on a second message-exchange with the second wireless communication device after pairing with the second wireless communication device; and processing means for determining an encryption key according to a third message exchange with the second wireless communication device based on the PMKSA, the encryption key configured to encrypt a P2P communication with the second wireless communication device.

24. The apparatus of claim 23 comprising means for determining the negotiated bootstrapping mechanism based on a match between a first identified bootstrapping functionality of the one or more first bootstrapping functionalities and a second identified bootstrapping functionality of the one or more second bootstrapping functionalities.

* * * * *